US005419852A

United States Patent [19]

Rivas et al.

[11] Patent Number: 5,419,852

[45] Date of Patent: May 30, 1995

[54] BIMODAL EMULSION AND ITS METHOD OF PREPARATION

[75] Inventors: Hercilio Rivas; Gustavo Nûnez, both of Caracas; Gerardo Sánchez, Monagas, all of Venezuela

[73] Assignee: Intevep, S.A., Caracas, Venezuela

[21] Appl. No.: 801,472

[22] Filed: Dec. 2, 1991

[51] Int. Cl.[6] .......................... B01J 13/00; C10L 1/32; F17D 1/17

[52] U.S. Cl. ...................................... 252/312; 44/301; 137/13; 252/314

[58] Field of Search .................. 252/312, 314; 44/300, 44/301; 137/13; 431/2

[56] References Cited

U.S. PATENT DOCUMENTS

| | | | |
|---|---|---|---|
| 4,513,017 | 4/1985 | Moran et al. | 426/603 |
| 4,610,695 | 9/1986 | Crespin et al. | 44/280 |
| 4,795,478 | 1/1989 | Layrisse et al. | 252/312 X |
| 4,923,483 | 5/1990 | Layrisse et al. | 252/312 X |
| 4,983,319 | 1/1991 | Gregoli et al. | 252/312 X |

OTHER PUBLICATIONS

M. I. Briceno et al., "Emulsion Technology for the production and handling of extra-heavy crude oil and Bitumins", *Revista Technica Intevep,* 10(1):5-14 Jun. 5, 1990.

*Primary Examiner*—Philip Tucker
*Assistant Examiner*—Daniel S. Metzmaier
*Attorney, Agent, or Firm*—Bachman & LaPointe

[57] ABSTRACT

A stable, low viscosity bimodal oil in water emulsion having an emulsifier, a continuous water phase and a discontinuous oil phase having an oil:water ratio of from about 70:30 to about 85:15 by weight, the discontinuous oil phase being characterized by two distinct oil droplet sizes $D_L$ and $D_S$ wherein $D_L$ is about 10 to 40 microns and $D_S$ is less than or equal to 5 microns, the ratio of $D_L/D_S$ is greater than or equal to 4 and about 45 to 85% by weight of the oil is in oil droplet size $D_L$.

3 Claims, No Drawings

BIMODAL EMULSION AND ITS METHOD OF PREPARATION

BACKGROUND OF THE INVENTION

The present invention relates to a stable, low viscosity bimodal oil in water emulsion and, more particularly, a bimodal oil in water emulsion having a discontinuous oil phase characterized by two distinct mean diameter oil droplet sizes. The present invention further relates to a method for producing a stable, low viscosity bimodal oil in water emulsion whose viscosity does not age over time.

Reserves of viscous hydrocarbons are plentiful. Low API gravity, viscous hydrocarbons found in Venezuela, Canada, the Soviet Union and the United States have viscosities ranging from 10,000 to more than 500,000 centipoise at ambient temperatures and API gravities of less than 15. These oil reserves are generally located at remote places far away from the large oil consumption centers of the world.

Viscous hydrocarbons of the type aforesaid are currently produced either by steam injection in combination with mechanical pumping, mechanical pumping itself, or by mining techniques. Because of the high viscosity of the viscous hydrocarbons it is impossible to handle them by conventional equipment. The alternative methods developed for handling viscous hydrocarbons tend to be very expensive.

The formation of emulsions of viscous hydrocarbons in water allows for improved handling of the viscous hydrocarbons as, under certain conditions, the viscous oil in water emulsions have lower viscosities than the viscous hydrocarbons themselves. It is well known in the art to transport viscous hydrocarbons by first forming a viscous hydrocarbon in water emulsion and thereafter pumping the emulsion which is at a lower viscosity through conventional pipelines. Generally, the viscous hydrocarbon in water emulsions formed for transportation in the manner described above comprise emulsions where the dispersed phase content of viscous oil in the oil in water emulsion is less than or equal to 70% by weight. The oil content is classically limited to a maximum value of 70% by weight as a result of the fact that emulsion viscosity increases in an exponential factor when the dispersed oil phase increases beyond 70% by weight. In addition, for viscous hydrocarbon in water emulsions having dispersed oil phase concentrations of greater than 70% by weight and monomodal mean diameter droplet size distribution, conventional means for transporting the emulsions become inoperative due to the high viscosity of the emulsions and the complexity of the realogical behavior of the emulsions as a result of the visco-elastic nature of these emulsions. It is well known in the prior art that the realogy properties of oil in water emulsions are significantly influenced by distribution and the mean diameter oil droplet size. Thus, for any known viscous hydrocarbon in water ratio in an oil in water emulsion and for any given mean diameter oil droplet size distribution, the viscosity of the resultant oil in water emulsion diminishes when the oil droplet size distribution becomes more poly-dispersed. In other words, a mono-dispersed emulsion has a viscosity greater than the same emulsion with a poly-dispersed droplet size distribution.

It is highly desirable when transporting these high dispersed phase concentrated viscous hydrocarbon in water emulsions by pipeline or tanker over large distances to increase the internally dispersed viscous hydrocarbon phase to a maximum possible value. By maximizing the viscous hydrocarbon content of the emulsion the cost for transportation is decreased per unit of viscous hydrocarbon. Furthermore, when these viscous hydrocarbon in water emulsions are used directly as fuels in power plants, the greater viscous hydrocarbon concentration in the emulsion results in a corresponding greater energy output by unit volume of the emulsion.

Accordingly, it is the principal object of the present invention to provide a viscous hydrocarbon in water emulsion characterized by a high internal phase concentration of viscous hydrocarbon, a relatively low viscosity and stable viscosity over time.

It is a further objection of the present invention to provide a viscous hydrocarbon in water emulsion as aforesaid which is characterized by a distinct bimodal dispersed viscous hydrocarbon oil phase.

It is a still further object of the present invention to provide a viscous hydrocarbon in water emulsion as aforesaid wherein the viscosity of the emulsion can be readily adjusted and modified without further shearing of the emulsion product.

It is a further principal object of the present invention to provide a method for preparing a stable, low viscosity bimodal viscous hydrocarbon in water emulsion which is resistant to aging over time and may have viscosity modifications made to any desired value for fulfillment of any end use requirement.

SUMMARY OF THE INVENTION

The foregoing objects and advantages are achieved by way of the present invention which provides for a stable, low viscosity bimodal viscous hydrocarbon in water emulsion and a method for making same.

In accordance with the present invention the stable, low viscosity bimodal viscous hydrocarbon in water emulsion of the present invention comprises a continuous water phase and a discontinuous oil phase wherein the hydrocarbon to water ratio of from about 70:30 to about 85:15 by weight. In accordance with a critical feature of the emulsion of the present invention, the discontinuous viscous hydrocarbon oil phase is characterized by two distinct oil phases having mean diameter oil droplet sizes of $D_L$ and $D_S$ respectively wherein $D_L$ is about 15 to 30 microns and $D_S$ is less than or equal to 5 microns. In accordance with the preferred embodiment of the present invention, the mean diameter oil droplet size $D_S$ is less than or equal to 3 microns. The hydrocarbon in water emulsion of the present invention is further characterized in that the ratio of $D_L/D_S$ is greater than or equal to 5 and preferably greater than or equal to 10 and about 45 to 85% by weight, preferably 70 to 80% by weight, of the viscous hydrocarbon is of mean diameter oil droplet size $D_L$. In accordance with a further preferred feature of the present invention, the stable, low viscosity bimodal viscous hydrocarbon in water emulsion exhibits superior aging properties over time when the maximum salt content of the hydrocarbon in water emulsion is maintained at below 30 ppm.

The method for preparing a stable, low viscosity bimodal viscous hydrocarbon in water emulsion as set forth above comprises providing a dehydrated viscous hydrocarbon feedstock with a salt content of less than 15 ppm and thereafter preparing two separate viscous hydrocarbon in water emulsions wherein one of the viscous hydrocarbon in water emulsions has a dispersed viscous hydrocarbon phase having a mean diameter droplet size of less than 5 microns and the other viscous hydrocarbon in water emulsion has a dispersed phase of viscous hydrocarbon having a mean oil droplet size of from between 10 to 40 microns, preferably between 15 to 30 microns wherein the ratio of viscous hydrocarbon to water in the emulsions is from about 70:30 to about 85:15% by weight. Thereafter, the two distinct viscous hydrocarbon in water emulsions are mixed together in a proportion so as to obtain about 45 to 85% by weight, preferably 70–80% by weight, of the oil in the mean oil droplet size of between 10 to 40 microns, preferably between 15 to 30 microns thereby forming a final hydrocarbon in water emulsion having a viscosity of less than 1500 cps at 1 $sec^{-1}$ and 30° C. wherein the viscous hydrocarbon material phase exists as two distinct, definable mean diameter droplet size distributions.

The method of the present invention results in a stable, low viscosity bimodal viscous hydrocarbon in water emulsion which is characterized by a high internal oil phase concentration, a relatively low viscosity and a stable viscosity over time. The viscous hydrocarbon in water emulsion product of the present invention is readily transportable by conventional equipment, either pipeline and/or tanker, and exhibits excellent aging properties. The method of the present invention allows for adjusting the viscosity of the viscous hydrocarbon in water emulsion without subjecting the emulsion to further shearing action.

Further objects and advantages of the present invention will become apparent hereinbelow.

DETAILED DESCRIPTION

The present invention is drawn to a stable, low viscosity bimodal viscous hydrocarbon in water emulsion which is characterized by low viscosity and superior aging properties. The present invention is further drawn to a method for the preparation of such a bimodal viscous hydrocarbon in water emulsion.

When handling viscous hydrocarbons, particularly heavy and extra heavy viscous crude oils, natural bitumens or refinery residuals, a viscous hydrocarbon in water emulsion having minimal viscosity values can be produced by preparing an emulsion having two distinct dispersed oil phases wherein each of the oil phases has a well defined mean diameter oil droplet particle size and where each size exists in a specific ratio relative to each other. It has been found that in order to obtain a stable, low viscosity bimodal hydrocarbon in water emulsion wherein the discontinuous oil phase within the continuous water phase has an oil to water ratio of about 70:30 to about 80:15% by weight, the discontinuous oil phase should be present in two distinct and definable oil droplet sizes, one having a large mean diameter droplet size ($D_L$) and one having a small mean diameter droplet size ($D_S$). In accordance with the present invention the small mean diameter oil droplet size distribution ($D_S$) is less than or equal to 5 microns and preferably less than or equal to 3 microns and the large mean diameter oil droplet size distribution ($D_L$) is about between 10 to 40 microns and preferably 15 to 30 microns. In order to obtain very low viscosities in the final hydrocarbon in water emulsion product it has been found that the ratio of the large size diameter oil droplet particles, $D_L$, to the smaller diameter oil droplet particles, $D_S$, be greater than or equal to 5 and preferably greater than or equal to 10. In addition, in order to achieve the lowest possible viscosity in the resultant hydrocarbon in water emulsion, 45 to 85% by weight and preferably 70 to 80% by weight of the viscous hydrocarbon in the hydrocarbon in water emulsion should be of oil droplet size $D_L$, that is, 15 to 30 microns. In order to form a hydrocarbon in water emulsion which is resistant to aging, that is where the viscosity of the emulsion does not increase over time, the maximum salt content of the emulsion product should be preferably less than or equal to 5 ppm.

The stable hydrocarbon in water emulsion product of the present invention is prepared by producing two distinct viscous hydrocarbon in water emulsion products having the preferred oil droplet sizes $D_L/D_S$ described above and thereafter mixing the emulsions in preferred amounts so as to obtain the final product having the required weight percent oil in large droplet size $D_L$. The oil to water ratio of each of the prepared hydrocarbon in water emulsions should range from about 70:30 to about 85:15. The emulsions are prepared using an HIPR technique described in U.S. Pat. No. 4,934,398. The hydrocarbons employed in the method of the present invention are viscous hydrocarbons characterized by API gravities of less than 15 and viscosities as great as 100,000 centipoise at 30° C. or greater. The resultant viscous hydrocarbon in water emulsion product is characterized by a viscosity of no greater than 1500 centipoise at 30° C.

In order to insure proper aging properties of the resultant hydrocarbon in water emulsion product, the viscous hydrocarbon employed in forming the emulsions of the present invention should be dehydrated and desalted to a salt content of less than 40 ppm preferably less than 15 ppm. By controlling the salt content of the final emulsion product stability of the emulsion and superior aging properties of the emulsion are obtainable.

The present invention allows for tailoring of the viscosity of resulting emulsions by controlling the amount of oil in the emulsion in the form of either distinct oil droplet size $D_L$ and $D_S$. The viscosity modification can be changed therefor without modifying the hydrocarbon to water ratio and without sacrificing emulsion stability as a result of shearing and stressing energies normally required to change emulsion viscosity. In order to modify the viscosity of the bimodal emulsion of the present invention one need only to vary the proportion of large droplet sizes $D_L$ to small droplet sizes $D_S$ of the dispersed viscous hydrocarbon phase.

Further details and advantages of the product and process of the present invention will appear from the following illustrative examples.

EXAMPLE 1

Emulsions were prepared using HIPR technique as shown in U.S. Pat. No. 4,934,398 using Cerro Negro natural bitumen from a Venezuelan Oil Field named CERRO NEGRO. The emulsions were made as shown in Table I using an aqueous solution of a surfactant based on a formulation named INTAN-100®, a registered trademark of INTEVEP, S.A. and which is an alkyl-phenol ethoxylated emulsifier. The initial oil to water ratio was 93/7, 90/10, 85/15, 80/20 by weight. The mixture was heated to 60° C. and stirred changing the mixing speed and mixing time such as to obtain average droplet size distribution of 2, 4, 4, 20, and 30 microns and monomodal droplet size distribution. Once prepared such emulsions with the droplet size desired were diluted with water as to obtain a ratio of oil to water of 70/30, 75/25, 80/20 by weight.

All emulsions were stabilized with 3000 mg/l of INTAN-100® with respect to the oil, except those with droplet size were of less than 3 microns which required about 5000 mg/l of INTAN-100® emulsifier.

Emulsion properties are shown in Table I.

TABLE I

| EMULSION | BITUMEN/ WATER (by weight) | DROPLET DIAMETER MICRONS | VISCOSITY AT $SEC^{-1}$ AND 30° C. |
|---|---|---|---|
| 1 | 70/30 | 2.1 | 16.000 |
| 2 | 70/30 | 4.3 | 11.000 |
| 3 | 70/30 | 20.7 | 3.000 |
| 4 | 70/30 | 29.8 | 2.500 |
| 5 | 75/25 | 2.1 | 52.000 |
| 6 | 75/25 | 4.3 | 30.000 |
| 7 | 75/25 | 20.7 | 9.500 |
| 8 | 75/25 | 29.8 | 6.000 |
| 9 | 80/20 | 2.1 | 100.000 |
| 10 | 80/20 | 4.3 | 38.000 |
| 11 | 80/20 | 20.7 | 17.000 |
| 12 | 80/20 | 29.8 | 8.500 |

Emulsions 2 and 3, those having oil:water ratio 70:30 and average droplet size distribution of 4.3 and 20.7 microns, were mixed together in different proportions and the viscosities of the resultant bimodal emulsions were measured. The results are shown in Table II below.

TABLE II

| EMULSION | % BY WEIGHT EMULSION W/MEAN DROPLET SIZE OF 4.3 MICRONS | % BY WEIGHT EMULSION W/MEAN DROPLET SIZE OF 20.7 MICRONS | VISCOSITY AT $SEC^{-1}$ AND 30° C. |
|---|---|---|---|
| A | 100 | 0 | 11.000 |
| B | 75 | 25 | 5.000 |
| C | 50 | 50 | 400 |
| D | 25 | 75 | 90 |
| E | 0 | 100 | 3.000 |

Table II shows that a relationship exists between the fraction of the oil phase of the emulsion in large droplet size distribution (20.7 microns) and small droplet size distribution (4.3 microns). In order to accomplish the lowest viscosity value both droplet fraction must be clearly defined as two identifiable and distinct size distributions. The relationship between the ratio by weight of the large droplet size diameter and small droplet size diameter for which the lowest bimodal emulsion viscosity is found about 25% by weight of small size droplets and 75% by weight of large size droplets.

EXAMPLE 2

Bimodal emulsions containing 75% by weight of a large droplet size emulsion $D_L$ and 25% by weight of a small droplet size emulsion $D_S$ in a total oil to water ratio in the final emulsion product of 70:30 were made from the emulsions of Table I as described in Table III below.

TABLE III

| EMULSION | MEAN DROPLET $D_S$ MICRONS | MEAN DROPLET $D_L$ MICRONS | RATIO OF $D_L/D_S$ | RATIO BY WT. OF OIL EMUL. $D_L$/EMUL. $D_S$ | VISCOSITY AT/$SEC^{-1}$ AND 30° C. |
|---|---|---|---|---|---|
| F | 2.1 | 29.8 | 14 | 75/25 | 66 |
| G | 4.4 | 29.8 | 7 | 75/25 | 90 |
| H | 5.2 | 29.6 | 6 | 75/25 | 148 |

Table III shows the relationship between viscosity of a bimodal emulsion and the effect of the ratio of large mean droplet size to small mean droplet size ($D_L/D_S$) for emulsions with a ratio of oil:water of 70:30% by weight. It can be seen, that the bimodal emulsion viscosity increases when there is an increase in the fraction of small mean diameter droplet size. However, all the viscosity values reported for emulsions F, G and H are far below the monomodal emulsions having 70% by weight oil as the dispersed phase. (See Table I)

EXAMPLE 3

With the emulsions as prepared in Example 1 which characteristics are shown in Table I, bimodal emulsions containing 75% by weight of a large droplet size emulsion $D_L$ and 25% by weight of a small droplet size emulsion $D_S$ in a total oil to water ratio in the final emulsion product of 75:25 were produced as shown in Table IV.

TABLE IV

| EMULSION | MEAN DROPLET $D_S$ MICRONS | MEAN DROPLET $D_L$ MICRONS | $D_L/D_S$ | RATIO BY WT. OF EMUL.$D_L$/EMUL.$D_S$ | VISCOSITY AT/ $SEC^{-1}$ AND 30° C. |
|---|---|---|---|---|---|
| I | 2.1 | 20.7 | 10 | 75/25 | 180 |
| J | 4.3 | 20.7 | 5.7 | 75/25 | 600 |
| K | 2.1 | 29.8 | 14 | 75/25 | 150 |
| L | 4.3 | 29.8 | 4 | 75/25 | 300 |

Table IV shows the relationship between viscosity and the ratio of large mean droplet size to small mean droplet size ($D_L/D_S$) for bimodal emulsions with an oil to water ratio of 75:25 by weight.

It can be seen that a viscosity below 1500 cps at/-$sec^{-1}$ and 30° C. can be obtained when the ratio of large mean droplet size to small mean droplet size ($D_L/D_S$) should be greater than or equal to 5.

EXAMPLE 4

With emulsions as prepared in Example 1 whose characteristics are shown in Table I further bimodal emulsions having different ratios of ($D_L/D_S$) and containing 75% by weight of a large droplet size emulsion $D_L$ and 25% by weight of a small droplet size emulsion $D_S$ in a total oil to water ratio in the final emulsion product of 80:20 were prepared as shown in Table V wherein the oil:water ratio of the emulsion was 80:20.

TABLE V

| EMULSION | MEAN DROPLET $D_S$ MICRONS | MEAN DROPLET $D_L$ MICRONS | $D_L/D_S$ | RATIO BY WT. OF EMUL.$D_L$/EMUL.$D_S$ | VISCOSITY AT/ $SEC^{-1}$ AND 30° C. |
|---|---|---|---|---|---|
| M | 2.1 | 20.7 | 10 | 75/25 | 1.100 |
| N | 4.3 | 20.7 | 5.7 | 75/25 | 14.000 |
| O | 2.1 | 29.9 | 14 | 75/25 | 450 |
| P | 4.3 | 29.8 | 4 | 75/25 | 7.500 |

Table V shows the relationship between viscosity and the ratio of large mean droplet size to small mean droplet size ($D_L/D_S$) for bimodal emulsions with an oil:water ratio of 80:20% by weight. It can be seen that a bimodal emulsion having a ratio of oil:water of 80:20, in other words 80% dispersed oil phase, it is necessary that the ratio of large mean droplet size to small mean droplet size ($D_L/D_S$) should be greater than or equal to 10 in order to obtain a desired low viscosity below 1500 cps at 1 $sec^{-1}$ and 30° C. EXAMPLE 5

With the emulsions prepared in Example 1 whose characteristics are shown in Table I, further bimodal emulsions were prepared having the different ratios of large mean droplet size emulsion $D_L$ over small mean droplet size emulsion $D_S$ by weight as shown in Table VI.

TABLE VI

| EMULSION | MEAN DROPLET $D_S$ MICRONS | MEAN DROPLET $D_L$ MICRONS | RATIO BY WT. OF EMUL.$D_L$/EMUL.$D_S$ | VISCOSITY AT/ $SEC^{-1}$ AND 30° C. |
|---|---|---|---|---|
| Q | 2.1 | 29.8 | 80/20 | 600 |
| R | 2.1 | 29.8 | 75/25 | 450 |
| S | 2.1 | 29.8 | 70/30 | 800 |
| T | 2.1 | 29.8 | 65/35 | 1.500 |

Table VI shows the relationship between viscosity and proportion by weight of small mean droplet size to large mean droplet size ($D_L/D_S$) for bimodal emulsions with an oil to water ratio of 80:20 by weight. It can be seen that the viscosity of a bimodal emulsion having a ratio of oil:water 80:20, in other words 80 percent dispersed oil phase in 20% continuous oil phase can be modified by just changing the proportion of oil by weight in the small mean droplet and large mean droplet sizes. When there is an increase value in the portion of small mean droplets the viscosity decreases and then increases.

This invention may be embodied in other forms or carried out in other ways without departing from the spirit or essential characteristics thereof. The present embodiment is therefore to be considered as in all respects illustrative and not restrictive, the scope of the invention being indicated by the appended claims, and all changes which come within the meaning and range of equivalency are intended to be embraced therein.

What is claimed is:

1. A stable, low viscosity bimodal oil in water emulsion comprising an emulsifier, a continuous water phase and a discontinuous oil phase having an oil:water ratio of from about 70:30 to about 85:15 by weight, said discontinuous oil phase comprises a viscous hydrocarbon having an API gravity of less than or equal to 15 and a viscosity at/$sec^{-1}$ and 30° C. of greater than 5000 cps and being characterized by two distinct oil droplet sizes $D_L$ and $D_S$ wherein $D_L$ is about 10 to 40 microns and $D_S$ is less than or equal to 5 microns, the ratio of $D_L/D_S$ is greater than or equal to 5 and about 45 to 85% by weight of the oil is in oil droplet size $D_L$.

2. The oil in water emulsion of claim 1 wherein $D_L$ is about 15 to 30 microns, $D_S$ is less than or equal to 3 microns, the ratio of $D_L/D_S$ is greater than or equal to 10 and about 70 to 80% by weight of the oil is in oil droplet size $D_L$.

3. The oil in water emulsion of claim 1 wherein the salt content of the final bimodal emulsion is less than or equal to 40 ppm.

* * * * *